UNITED STATES PATENT OFFICE.

PIERRE LEROUX, OF GENNEVILLIERS, FRANCE, ASSIGNOR TO LA SOCIETE D'ECLAIRAGE, CHAUFFAGE ET FORCE MOTRICE, OF PARIS, FRANCE.

PRODUCTION OF PURE ANTHRACENE.

1,326,515.     Specification of Letters Patent.     Patented Dec. 30, 1919.

No Drawing.     Application filed August 24, 1918. Serial No. 251,346.

*To all whom it may concern:*

Be it known that I, PIERRE LEROUX, citizen of the Republic of France, and resident of Gennevilliers, France, (post-office address Route du Pont d'Epinay,) have invented a new and useful Production of Pure Anthracene, which improvements are fully set forth in the following specification.

The present invention relates to a process for the production of pure anthracene.

The anthracene used in the production of anthraquinone is generally about 90 to 95% pure. The process most frequently used to obtain this percentage strength consists in utilizing the dissolving action of pyridin bases in which anthracene is but slightly soluble in the cold.

Creosote oil has also been used for obtaining crude anthracene. Creosote oil consists of hydrocarbons and contains only a small amount (about 10 to 20%) of phenols, mostly cresols, and higher homologues, (Lunge, "*Coal Tar and Ammonia*," part 2, 1916, page 656). However, it is the hydrocarbons and not the phenols contained in creosote oil, which act as purifying agents for the anthracene. Lunge states on page 614, ("*Coal Tar and Ammonia*," part 2, 1916) that washing with creosote oil removes paraffin from anthracene, and that creosote oil, previously freed from phenol by washing with caustic soda, removes most of the paraffin.

The object of the present invention is a process which allows squeezed or drained crude anthracene to be concentrated before the treatment with pyridin.

Anthracene obtained from anthracene oil shows generally a concentration of 18 to 25%, and according to the present invention, an additional concentration is effected by dissolving in the warm, anthracene obtained from anthracene oil in phenol (including crude phenol), cresol (including tri-cresol, *i. e.* a mixture of meta, ortho, and para cresols and including meta-para-cresol *i. e.* a mixture of meta and para-cresol), xylenol and the like homologues of phenol, either used alone or in admixture with each other, cooling the solution to crystallize out the anthracene, separating the crystals from the mother liquor by filtration or centrifuging and washing said crystals from the mother liquor by filtration or centrifuging and washing said crystals by means of cresols or the like homologues of phenol or mixtures of such phenols.

By way of example: crude anthracene is dissolved, in the warm, in two or three times its own weight of the phenol or its homologues. After cooling, the crystals are separated by filtering or centrifuging and are washed with cresols. The solvent can be eliminated either by the action of heat, by washing with benzene or other organic solvent, or by treating with alkaline water and afterward with ordinary water.

In this way anthracene with a concentration of 50 to 60% is obtained.

By repeating this phenol treatment it is possible to obtain a 70% anthracene. In this case the phenol products used for the second concentration are used for the first treatment of a new batch. The phenol products can be recovered by distillation.

What I claim as new and desire to secure by Letters Patent of the United States is:—

1. The herein-described process of concentrating anthracene, which comprises dissolving crude anthracene in a phenol, and thereafter crystallizing out the anthracene from the solution so obtained.

2. The process of concentrating anthracene, which consists in dissolving crude anthracene in the warm in a phenol, cooling the solution to crystallize out the anthracene, and separating the anthracene crystals from the mother liquor.

3. The process of concentrating anthracene, which consists in dissolving crude anthracene in the warm in a phenol, cooling the solution to crystallize out the anthracene, separating the anthracene crystals from the mother liquor, and washing said crystals with a phenol.

4. The process of concentrating anthracene, which consists in dissolving crude anthracene in the warm in a phenol, cooling the solution to crystallize out the anthracene, separating the anthracene crystals from the mother liquor, and washing said crystals by means of cresols.

5. The process of concentrating anthracene, which consists in treating crude anthracene with a phenol, and thereafter treating the anthracene obtained with pyridin for further concentration.

6. The process of concentrating anthracene, which consists in dissolving crude anthracene in the warm in a phenol, cooling the solution to crystallize out the anthracene, separating the anthracene crystals from the mother liquor, and thereafter treating said crystals with pyridin for further concentration.

7. The process of concentrating anthracene, which consists in dissolving crude anthracene in the warm in a phenol, cooling the solution to crystallize out the anthracene, separating the anthracene crystals from the mother liquor, washing said crystals with a phenol, and thereafter treating said crystals with pyridin for further concentration.

8. The process of concentrating anthracene, which consists in dissolving crude anthracene in the warm in a phenol, cooling the solution to crystallize out the anthracene, separating the anthracene crystals from the mother liquor, washing said crystals by means of cresols, and thereafter treating said crystals with pyridin for further concentration.

In testimony whereof I have signed this specification in the presence of two subscribing witnesses.

PIERRE LEROUX.

Witnesses:
GEORGES LOISEL,
JOHN F. SIMONS.